(12) United States Patent
Khoshnevis

(10) Patent No.: US 7,241,415 B2
(45) Date of Patent: *Jul. 10, 2007

(54) METALLIC PARTS FABRICATION USING SELECTIVE INHIBITION OF SINTERING (SIS)

(75) Inventor: Behrokh Khoshnevis, Marina Del Rey, CA (US)

(73) Assignee: University of Southern California, Los Angeles, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 10/610,622

(22) Filed: Jun. 30, 2003

(65) Prior Publication Data

US 2004/0018107 A1    Jan. 29, 2004

Related U.S. Application Data

(60) Provisional application No. 60/398,160, filed on Jul. 23, 2002.

(51) Int. Cl.
*B22F 3/16* (2006.01)
*B22F 7/02* (2006.01)
*B23K 26/00* (2006.01)
*B29C 35/08* (2006.01)

(52) U.S. Cl. .................. 419/6; 419/1; 419/61; 264/113; 264/497

(58) Field of Classification Search .................... 419/5, 419/38, 6; 264/497, 334
See application file for complete search history.

(56) References Cited

U.S. PATENT DOCUMENTS

| 4,698,317 A | 10/1987 | Inoue et al. | |
| 4,798,694 A | 1/1989 | Sugata et al. | |
| 5,076,869 A | * 12/1991 | Bourell et al. | 264/497 |
| 5,182,170 A | * 1/1993 | Marcus et al. | 264/497 |
| 5,204,055 A | * 4/1993 | Sachs et al. | 419/2 |
| 5,260,009 A | * 11/1993 | Penn | 264/401 |
| 5,340,656 A | 8/1994 | Sachs et al. | |

(Continued)

FOREIGN PATENT DOCUMENTS

RU    2 025 218    12/1994

(Continued)

OTHER PUBLICATIONS

Khoshnevis, B., et al., "SIS—A New SFF Method Based on Powder Sintering", *Solid Freeform Fabrication Symposium Proceedings*, pp. 440-447, Aug. 2002.

(Continued)

*Primary Examiner*—Roy King
(74) *Attorney, Agent, or Firm*—Fish & Richardson P.C.

(57) ABSTRACT

A selective inhibition of sintering (SIS) technique may be used to fabricate a three-dimensional (3-D) dense metal object from a binderless metal powder. Layers of metal powder are provided on a build tank. For each layer, regions of the layer are sinter-inhibited, e.g., by depositing a sinter-inhibiting material such as a ceramic slurry, a metal salt, or oxidizing metal particles in the powder using chemicals or a concentrated heat source. Each layer may be compacted before the next layer is provided. A final compact may then be sintered. Unwanted sintered sections may be removed from the compact at boundaries formed by the sinter-inhibited (unsintered) regions, and the object extracted.

24 Claims, 4 Drawing Sheets

U.S. PATENT DOCUMENTS

| | | | |
|---|---|---|---|
| 5,387,380 A * | 2/1995 | Cima et al. | 264/69 |
| 5,518,680 A | 5/1996 | Cima et al. | |
| 5,555,481 A * | 9/1996 | Rock et al. | 419/30 |
| 5,805,971 A * | 9/1998 | Akedo | 419/6 |
| 5,940,674 A * | 8/1999 | Sachs et al. | 419/2 |
| 5,989,476 A | 11/1999 | Lockard et al. | |
| 6,007,764 A * | 12/1999 | Benda et al. | 419/7 |
| 6,066,285 A * | 5/2000 | Kumar | 264/439 |
| 6,087,024 A | 7/2000 | Whinnery et al. | |
| 6,147,138 A * | 11/2000 | Hochsmann et al. | 523/139 |
| 6,241,934 B1 * | 6/2001 | Everett et al. | 264/401 |
| 6,363,606 B1 * | 4/2002 | Johnson et al. | 29/854 |
| 6,508,979 B1 * | 1/2003 | Requicha et al. | 419/7 |
| 6,508,980 B1 | 1/2003 | Sachs et al. | |
| 6,589,471 B1 * | 7/2003 | Khoshnevis | 264/497 |
| 6,780,368 B2 * | 8/2004 | Liu et al. | 264/401 |
| 2003/0114936 A1 * | 6/2003 | Sherwood et al. | 623/23.58 |

FOREIGN PATENT DOCUMENTS

| | | |
|---|---|---|
| RU | 2 048 272 | 11/1995 |
| RU | 2 080 963 | 6/1997 |
| RU | 2 086 356 | 8/1997 |
| WO | WO 88/02677 | 4/1988 |
| WO | WO 01/38061 | 5/2001 |
| WO | WO01/96048 | 12/2001 |

OTHER PUBLICATIONS

Fessler, et al., :"Laser deposition of metals for shape deposition manufacturing", *Proc. of the 1996 Solid Freeform Fabrication Symposium*, 8 pgs., 1996.

* cited by examiner

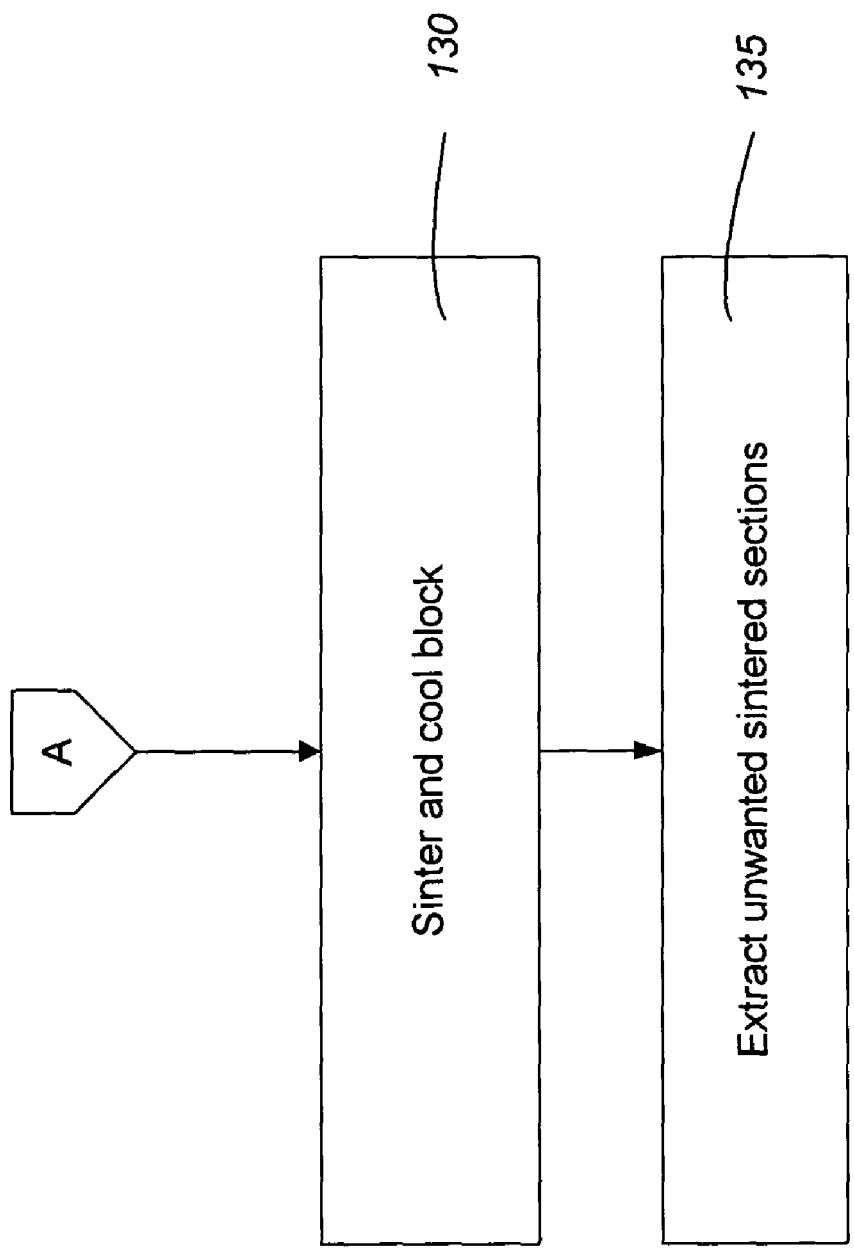

METALLIC PARTS FABRICATION USING SELECTIVE INHIBITION OF SINTERING (SIS)

CROSS-REFERENCE TO RELATED APPLICATIONS

This application claims priority to U.S. Provisional Application Ser. No. 60/398,160, filed on Jul. 23, 2002, and entitled "Metallic Parts Fabrication Using Selective Inhibition of Sintering (SIS)", and this application is a continuation-in-part of U.S. patent application Ser. No. 09/698,541, filed Oct. 26, 2000, and entitled "Selective Inhibition of Bonding of Powder Particles for Layered Fabrication of 3-D Objects".

BACKGROUND

Three-dimensional (3-D) objects, such as prototype parts, may be produced directly from computer-aided design (CAD) databases. Various technologies may be used to produce such objects, including layered additive processes. Current layered fabrication methods for building metallic parts typically use polymer binders mixed with metal powder. For example, in FDM (Fused Deposition Method) fabrication, a mix of polymer binder and metal powder is made into a filament which is fed through a heated extrusion nozzle. A green (unsintered) part is then formed by layer-by-layer extrusion of the material. In SLS (Selective Laser Sintering), a mix of loose powder (polymer and metal or polymer-coated metal) is spread into a thin layer and exposed to a laser which melts the polymer particles and bonds the metal powder in selected areas of each layer to form the green part. Other techniques use similar approaches with some variations. The green part is then sintered in a conventional sintering furnace where the fugitive polymer is eliminated.

There are several problems with the approaches described above. Use of polymer binders adds greatly to the sintering shrinkage factor. Also, the creation of dense metallic parts is difficult because of the existence of the binder in the green part structure. Furthermore, incineration of polymer binders during sintering may leave hard-to-remove residues on sintering furnaces and may present environmental hazards.

There are commercial processes for layered fabrication that use binderless metal powder. However, these methods require very expensive high power lasers. Moreover, building parts with overhang features may be problematic with these methods.

SUMMARY

A selective inhibition of sintering (SIS) technique may be used to fabricate a three-dimensional (3-D) metal object from a binderless metal powder. A number of layers of metal powder are provided on a build tank. For each layer, regions of the layer are sinter-inhibited. This may be achieved by, e.g., depositing a sinter-inhibiting material such as a metal salt (e.g., potassium phosphate) or ceramic slurry or by oxidizing metal particles in the powder using a concentrated heat source such as a laser or micro-torch. Each layer may be compacted before the next layer is provided. A final compact may then be sintered. Unwanted sintered sections may be removed from the compact at boundaries formed by the sinter-inhibited (unsintered) regions, and the object extracted.

BRIEF DESCRIPTION OF THE DRAWINGS

FIGS. 1A and 1B show a flowchart describing a selective inhibition of sintering (SIS)-metal process.

DETAILED DESCRIPTION

Figure 1A:
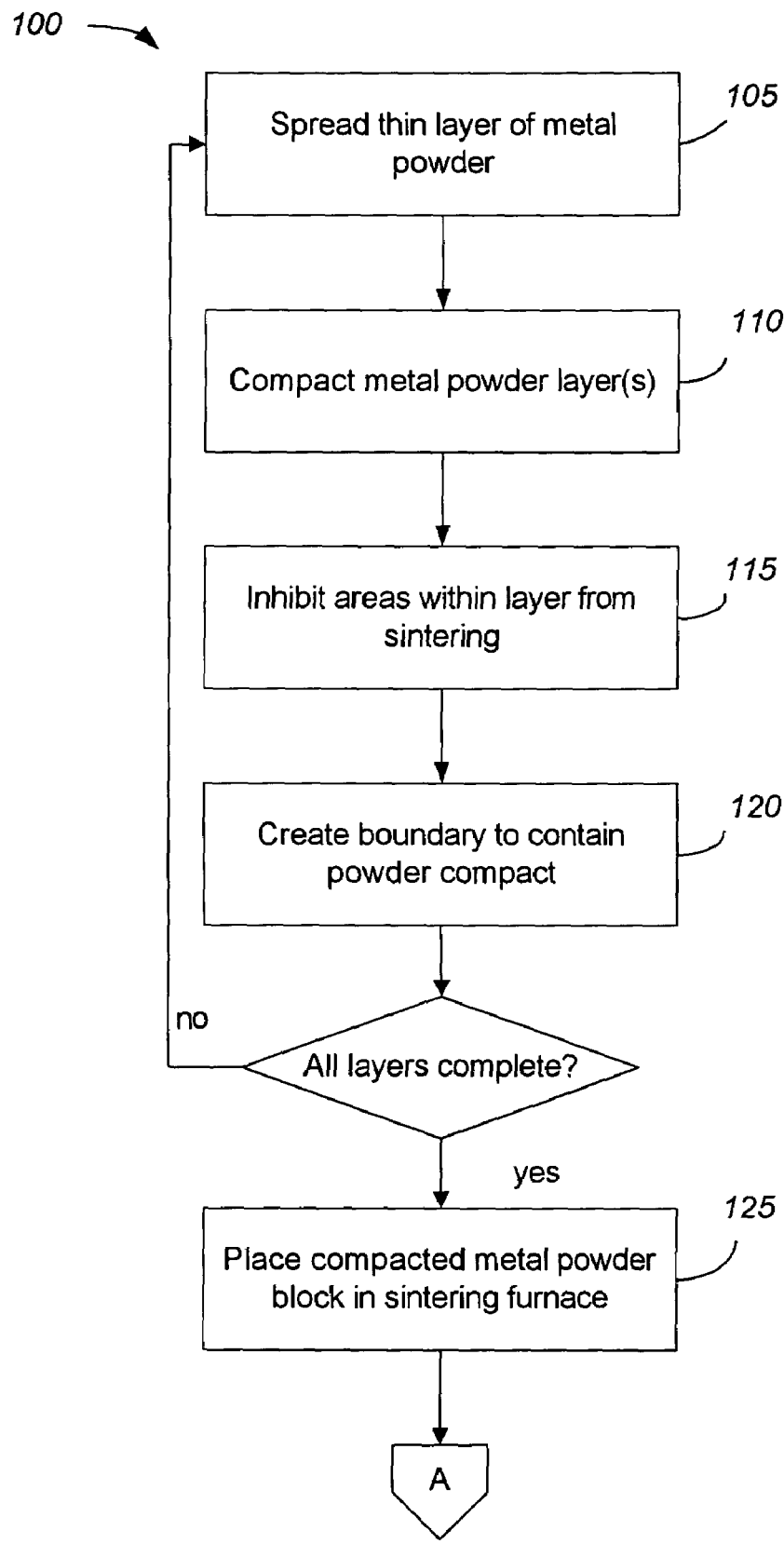
Figure 2:
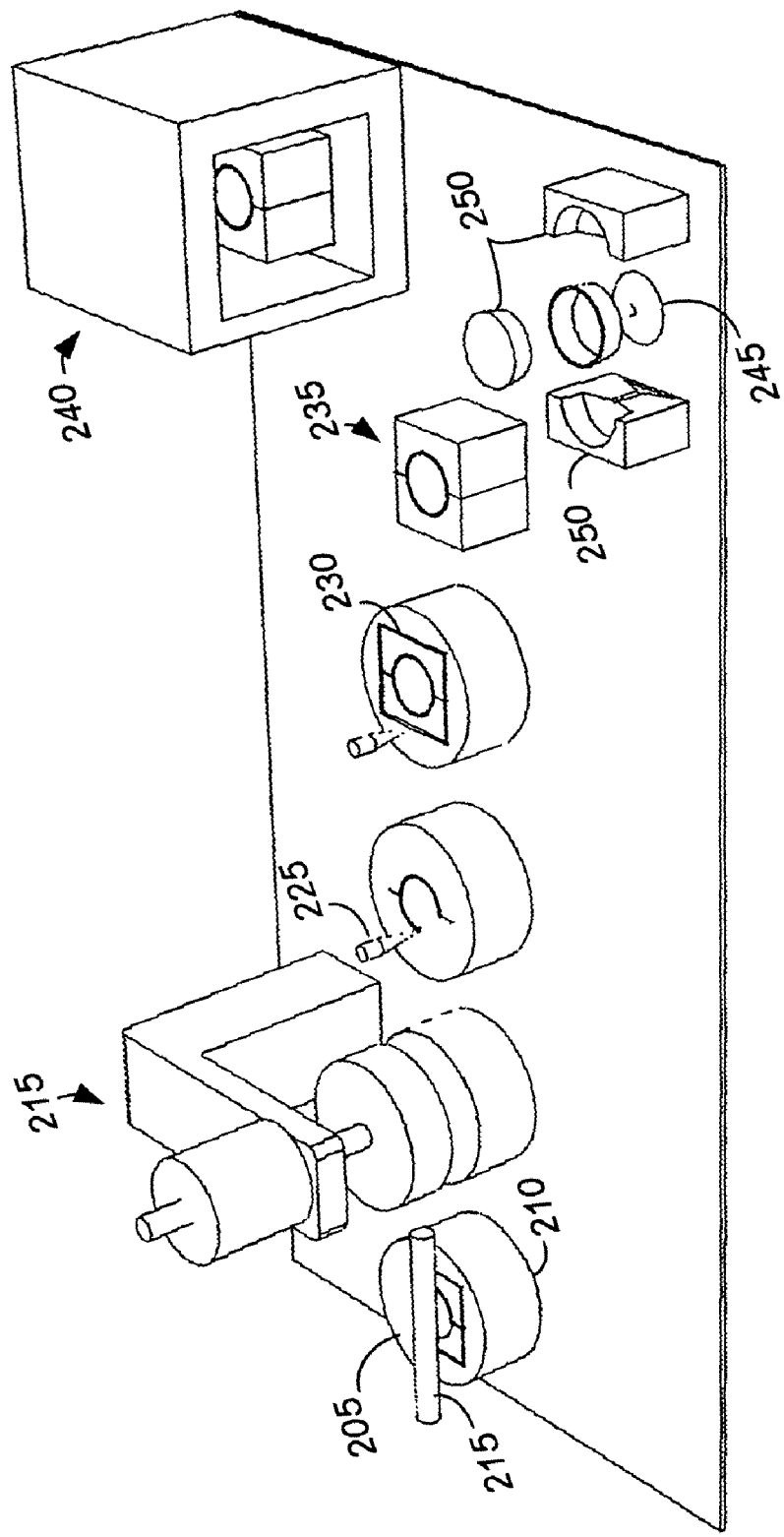
FIG. 2 is a perspective view of an exemplary system for practicing the SIS-metal process.

FIGS. 1A and 1B show flowchart describing a selective inhibition of sintering (SIS)-metal process 100, which is capable of building dense metallic parts of a desired geometry from metal powder without the use of molds or polymer binders. The desired geometry may be presented by a computer-aided design (CAD) model. The process may be used for paid fabrication of accurately formed, functional metallic parts. FIG. 2 illustrates exemplary stations which may be used in the process 100.

A metal powder is spread into a thin layer 205 over a build tank 210 using a roller 215 or a passing blade (block 105). A motorized press 220 equipped with a pressure sensor compacts the newly spread metal powder layer to create a powder bed with a specified density (block 110).

A concern associated with the use of low-pressure compaction is the effect of multiple compression cycles upon the powder density through the compact. As the compact is constructed in the build tank, the lower layers of the compact will experience repeated compressive forces as the succeeding layers of the compact are laid and compressed, whereas the upper layers of the compact will only experience a few compression cycles. The differences in total compressive force experienced by each layer may result in a density gradient through the compact. This potential problem may be alleviated by developing a program of compression pressures in which the pressure applied to compress each layer is adjusted in a pre-determined pattern. The program may be constructed such that each layer experiences approximately the same total compressive force throughout the build of the compact.

The use of high-pressure compaction may also increase the deformation of irregular particles at the upper surface of the layer. This may result in reduced inter-layer bonding with the following layer. Consequently, it may be necessary to introduce a mesh engraving or roughness to the surface of the punch in order to facilitate inter-layer bonding and avoid weak inter-layer bonds.

Since the SIS-metal process does not require a polymer binder to be pre-mixed with the metallic powder, the degree of compression imparted by the roller as it lays down the thin powder layer may be sufficient to produce a green compact of acceptable density for certain powders and applications. In certain applications, for example, the final part is intended to be porous. In which case, a separate process step involving compaction of the powder layer by a motorized press may be unnecessary. The compressibility of the powder and density of the compact may also be related to the choice of material, particle size, particle shape, layer thickness, and compression pressure.

A mechanism is used to inhibit certain areas (i.e., layer profile, hatch patterns, certain layer surface areas) within the powder bed from sintering (i.e., "sinter-inhibiting" the region) (block 115). Various chemical and/or mechanical inhibition methods may be used.

In an embodiment, an inkjet printer head or an extrusion nozzle 225 with a fine orifice may be used to deliver a chemical agent which alters the metal powder characteristic. For example, acid or other active chemicals may be used to create a metal salt, which under heat decompose and yield metal oxide. Metal oxides generally have higher sintering temperature than their base metal. The metal oxide may be created at the surface of the affected particles or in the entire body of affected particles. Alternatively, selected metal powders may be oxidized in presence of oxygen using a scanning laser beam with moderate power or a micro-torch that can be robotically moved above the powder bed.

Compaction may be performed before or after chemical inhibition, depending on the choice of metal and inhibitor and factors such as chemical penetration in the loose and compressed powder. The re-sequencing can be accomplished with a simple modification to the machine's control software. In either case, a heater may be used to speed the chemical reaction and dry out the inhibitor chemical for each layer. The chemical species remaining after inhibition and sintering should be either brittle or soluble in common solvents so as to facilitate separation of the sintered materials and extraction of the finished part. Note that an automated cleaning process may be used to wipe and clean the press surface from the chemical inhibitor material to prevent contamination of the subsequent layer surface.

Many metals and alloys are resistant to chemical reactions. Super alloy powders are an example of such a material. In these cases, a mechanical inhibition may be used to prevent sintering of the powder. Mechanical inhibition may also be preferable to chemical inhibition for common metals. Many of the chemicals used to etch or oxidize metals are irritating and/or harmful to living organisms, and therefore present safety and environmental concerns in certain situations.

Figures 3A, 3B, 3C, 3D:
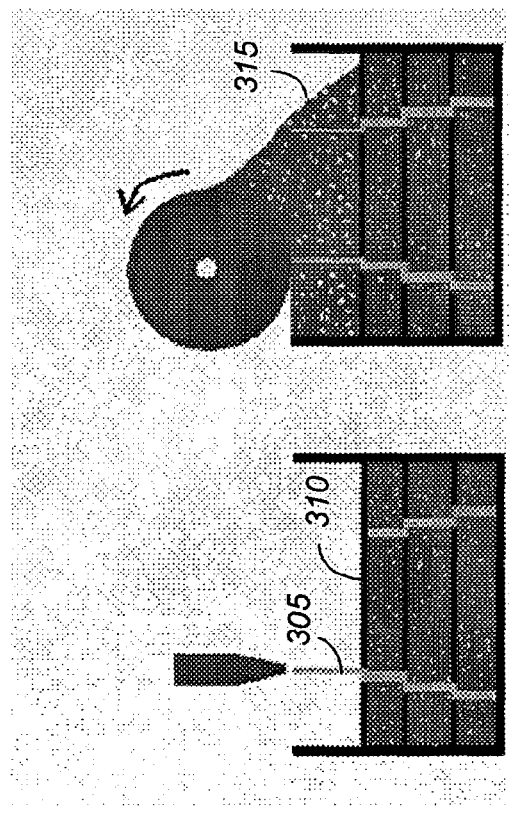
FIGS. 3A-3D illustrate an exemplary macroscopic mechanical inhibition method.

In an embodiment, a macroscopic mechanical inhibition method may be used. FIGS. 3A-3D illustrate an exemplary macroscopic mechanical inhibition method. A ceramic slurry 305 (or any other extrudable or printable material with very high sintering temperature) may be deposited on the previously compressed powder layer 310 (FIG. 3A), and, when dried, a new powder layer 315 may be laid down (FIG. 3B). This way, the deposited ceramic acts as a wall which separates the metal powder areas at the inhibition boundary. The height of slurry deposition should be close to the loose powder layer thickness. A passing blade 320 can be used to remove the loose metal powder which may be left by the powder-spreading roller on the top of the ceramic deposition (FIG. 3C). Layer compaction may then be performed, e.g., with a press 325 (FIG. 3D). An automated cleaning process may be used to wipe and clean the press surface from the inhibitor material to prevent contamination of the subsequent layer surface.

Dimensional control through the compression stage will necessitate that the compressibility of the chosen ceramic be close to that of the metallic powder. Differences in the contraction of the ceramic and metallic materials after sintering may also impact dimensional control.

In another embodiment, a microscopic mechanical inhibition may be used. A solution, such as a metal salt solution, may be applied to a selected areas of the loose powder layer by means of inkjet printing before compaction. Water in the solution evaporates and the salt crystals that are formed separate the metal powder particles at the inhibition boundaries. A candidate for many metals is potassium phosphate ($K_3PO_4$), which is water soluble and has a melting point above 1300° C.

Although a metal salt is described, the sinter-inhibiting material may be any other solution that when dried results in crystals or other solid forms with a high sintering temperature.

A boundary 230 may be created to contain the powder compact (block 120). This step of the process may be used to facilitate the transfer of the green powder block to the sintering furnace. For certain metals, such as copper, this step may be unnecessary as the compressed powder particles in such cases loosely adhere to one another by the "cold weld" phenomenon. The cold weld may produce sufficient strength in the green compact to allow the compact to be extracted from the build tank as a coherent mass having the same shape as the interior of the build tank.

In the absence of cold welding, intra-layer and inter-layer bonding may be weak. This may be true for certain metals, such as super alloys. In such cases it may be necessary to print an adhesive material at the periphery of each layer in order to create sufficient cohesion to extract a coherent mass from the build tank for transfer to the sintering furnace. The adhesive liquid may be deposited for each layer on the powder bed at the periphery of the part profile. The profile of this deposition may be a simple shape such as a square or circle. When all layers are completed, this adhesive creates a solid container around the selected powder area that contains the 3-D part. Alternatively, the build tank and its piston can be made of ceramic or a high temperature resistant metal, such as tungsten. The build tank assembly may be designed to be removable from the machine and transferable to the sintering furnace.

After all layers have been completed through the above steps, the compacted metal powder block 235 may be extracted from the build tank and placed in a conventional sintering furnace 240 (block 125). A ceramic base plate, initially placed on the build tank piston, over which the first powder layer is spread, may be used to safely pick up the unsintered powder block and transfer it to the sintering furnace along with the ceramic plate. After sintering and cooling (block 130), the sintered block is removed from the furnace, and as shown in FIG. 1, the part 245 is extracted from unwanted sintered sections 250 by being separated at the surfaces inhibited from sintering (block 135).

For certain types of metals layer-by-layer sintering (rather than bulk sintering), may be performed. This process will be much like an SIS-polymer process, however, the machine should be equipped with a heating device to sinter or melt the metal powder particles of each layer. An array of gas torches, a very high temperature electric filament, or other means may be used. It may be necessary to isolate the machine work area to create a volume void of oxygen in order to prevent oxidization of the metal powder. The work area of the machine would hence be similar to conventional sintering furnaces that have the capability of sintering in vacuum or in desired gases (such as inert gases or nitrogen). For certain metal powders that do not get oxidized (e.g., stainless steel) such isolation may be unnecessary.

The heating device may sinter selected regions on each layer to reduce powder waste. In a torch array, for example, this can be done by selectively turning certain torches on and off. Alternatively, an array of very high temperature electric filaments may be used to sinter selected regions, and the electric filaments may be selectively turned on or off by electric current or by a shutter.

The SIS-metal process is capable of creating dense metallic parts without the use of polymer binders, which add greatly to the sintering shrinkage factor and leave undesirable residues in the sintering furnace. Furthermore, the lack of polymer binders in the powder may result in higher fabrication accuracy. Other advantages include the elimination of undesirable environmental impacts of burning polymer binders and the elimination of sintering furnace contamination by burnt binder residues. The SIS-metal process may enable the building of parts with complex geometry which could include overhang features. The process also has a relatively low machine cost as expensive components such as laser generators are not used in the process.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
   providing a layer of a metal powder;
   sinter-inhibiting one or more regions in the layer;
   repeating said providing and sinter-inhibiting for a plurality of layers;
   compacting the plurality of layers to form a compact;
   sintering the compact; and
   removing one or more sintered sections at a boundary formed by the sinter-inhibited regions in the compact.

2. The method of claim 1, wherein said removing comprises extracting a three-dimensional (3-D) metal object from the compact.

3. The method of claim 1, wherein said compacting comprises compacting each layer before another layer is provided on said layer.

4. The method of claim 3, further comprising:
   compacting each layer after sinter-inhibiting one or more regions in the layer.

5. The method of claim 3, further comprising:
   compacting each layer before sinter-inhibiting one or more regions in the layer.

6. The method of claim 3, wherein said compaction comprises pressing the layer with a press surface, and further comprising:
   cleaning the press surface between each successive layer.

7. The method of claim 1, wherein said sinter-inhibiting comprises depositing a sinter-inhibiting material on the one or more regions of the layer.

8. The method of claim 7, wherein said depositing comprises extruding the sinter-inhibiting material through a nozzle.

9. The method of claim 7, wherein said depositing comprises printing the sinter-inhibiting material with a printer head.

10. The method of claim 7, wherein the sinter-inhibiting material comprises a solution that when dried results in crystals or other solid forms with a high sintering temperature.

11. The method of claim 7, wherein the sinter-inhibiting material comprises a metal salt.

12. The method of claim 11, wherein the metal salt comprises potassium phosphate ($K_3PO_4$).

13. The method of claim 7, wherein the sinter-inhibiting material comprises a ceramic slurry.

14. The method of claim 1, wherein said sinter-inhibiting comprises oxidizing metal powder particles in the one or more regions.

15. The method of claim 14, wherein said oxidizing comprises heating said metal power particles in the presence of oxygen.

16. The method of claim 15, wherein said oxidizing comprises scanning a laser over the one or more regions.

17. The method of claim 15, wherein said oxidizing comprises moving a micro-torch over the one or more regions.

18. The method of claim 1, wherein the metal powder comprises a binderless powder.

19. The method of claim 1, wherein said compacting comprises cold welding metal powder particles in the plurality of layers.

20. The method of claim 1, further comprising:
   creating a boundary in said plurality of layers to form a block.

21. The method of claim 20, wherein said creating the boundary comprises depositing an adhesive at a periphery of each layer.

22. A method comprising:
   providing a layer of a metal powder;
   sinter-inhibiting one or more regions in the layer;
   compacting the layer;
   sintering metal powder in the layer;
   repeating said providing, sinter-inhibiting, compacting, and sintering for a plurality of layers; and
   removing one or more sintered sections at a boundary formed by the sinter-inhibited regions in the compact.

23. The method of claim 22, wherein said removing comprises extracting a three-dimensional (3-D) metal object from the compact.

24. The method of claim 22, wherein the compaction of the layer is performed prior to the sinter-inhibiting.

* * * * *

UNITED STATES PATENT AND TRADEMARK OFFICE
CERTIFICATE OF CORRECTION

| | | |
|---|---|---|
| PATENT NO. | : 7,241,415 B2 | Page 1 of 1 |
| APPLICATION NO. | : 10/610622 | |
| DATED | : July 10, 2007 | |
| INVENTOR(S) | : Behrokh Khoshnevis | |

It is certified that error appears in the above-identified patent and that said Letters Patent is hereby corrected as shown below:

Column 1, line 5, insert the following paragraph:

--FEDERALLY SPONSORED RESEARCH OR DEVELOPMENT
This invention was made with government support under Contract No. 0088135 awarded by the National Science Foundation. The government has certain rights in this invention."--

Signed and Sealed this

Seventeenth Day of March, 2009

JOHN DOLL
*Acting Director of the United States Patent and Trademark Office*